United States Patent
Borchers et al.

(10) Patent No.: US 7,758,296 B2
(45) Date of Patent: Jul. 20, 2010

(54) METHOD FOR REDUCING THE NOISE OF TURBO ENGINES

(75) Inventors: Ingo Borchers, Uhldingen-Muehlhofen (DE); Roger Drobietz, Salem (DE); Thomas Lange, Immenstaad (DE)

(73) Assignee: EADS Deutschland GmbH, Ottobrunn (DE)

( * ) Notice: Subject to any disclaimer, the term of this patent is extended or adjusted under 35 U.S.C. 154(b) by 746 days.

(21) Appl. No.: 10/581,860

(22) PCT Filed: Sep. 30, 2004

(86) PCT No.: PCT/DE2004/002172

§ 371 (c)(1),
(2), (4) Date: Mar. 7, 2007

(87) PCT Pub. No.: WO2005/056984

PCT Pub. Date: Jun. 23, 2005

(65) Prior Publication Data

US 2007/0274823 A1    Nov. 29, 2007

(30) Foreign Application Priority Data

Dec. 6, 2003    (DE) .............................. 103 57 075

(51) Int. Cl.
*F02C 7/045*    (2006.01)

(52) U.S. Cl. .................. 415/1; 415/119; 415/142; 415/209.1; 416/1; 416/229 A; 416/500

(58) Field of Classification Search ............... 415/119, 415/208.1, 209.1, 142; 416/224, 229 A, 416/230, 500
See application file for complete search history.

(56) References Cited

U.S. PATENT DOCUMENTS

| 3,316,714 | A | * | 5/1967 | Smith et al. ................. 415/191 |
| 3,572,960 | A | | 3/1971 | McBride |
| 4,313,387 | A | | 2/1982 | Sato |
| 5,169,288 | A | * | 12/1992 | Gliebe et al. ................. 415/119 |
| 5,259,187 | A | | 11/1993 | Dunbar et al. |
| 5,355,417 | A | | 10/1994 | Burdisso et al. |
| 5,420,383 | A | | 5/1995 | Kousen et al. |
| 5,472,314 | A | | 12/1995 | Delonge et al. |
| 5,613,649 | A | | 3/1997 | Schlinker et al. |
| 6,004,095 | A | | 12/1999 | Waitz et al. |

(Continued)

FOREIGN PATENT DOCUMENTS

DE    961 742    4/1957

(Continued)

OTHER PUBLICATIONS

International Search Report dated Feb. 24, 2005 w/English translation of pertinent portion (Seven (7) pages).

(Continued)

*Primary Examiner*—Igor Kershteyn
(74) *Attorney, Agent, or Firm*—Crowell & Moring, LLP

(57) ABSTRACT

In a method for reducing noise generated in a turbo engine with cascades, and a stator-rotor arrangement, in which hydrodynamic pressure fluctuations occurring on the cascades are reduced by varying the surface circulation of at least one section of at least one stator. A structure is provided on one or more stators, influencing the surface circulation of at least one section of the stator.

20 Claims, 3 Drawing Sheets

U.S. PATENT DOCUMENTS

| | | |
|---|---|---|
| 6,076,776 A | 6/2000 | Breitbach et al. |
| 6,139,259 A | 10/2000 | Ho et al. |
| 6,292,763 B1 | 9/2001 | Dunbar et al. |
| 6,540,478 B2 | 4/2003 | Fiala et al. |

FOREIGN PATENT DOCUMENTS

| | | |
|---|---|---|
| DE | 43 08 892 A1 | 9/1994 |
| DE | 197 12 034 A1 | 9/1998 |
| DE | 694 09 717 T2 | 11/1998 |
| DE | 199 09 899 A1 | 9/2000 |
| DE | 100 53 361 C1 | 6/2002 |
| DE | 103 57 075 A1 | 7/2005 |
| EP | 0 610 091 A1 | 8/1994 |
| EP | 1 277 966 A2 | 7/2002 |
| GB | 1 345 835 A | 2/1974 |
| WO | WO 94/21914 A2 | 9/1994 |

OTHER PUBLICATIONS

Form PCT/IB/373; Form PCT/IB/326 and Form PCT/ISA/237 (Seven (7) pages).

* cited by examiner

METHOD FOR REDUCING THE NOISE OF TURBO ENGINES

This application is a National Phase of PCT/DE2004/002172, filed Sep. 30, 2004, and claims the priority of German patent document DE 103 57 075.6, filed Dec. 6, 2003, the disclosures of which is expressly incorporated by reference herein.

The invention relates to a method for reducing the noise of turbo engines, and to a rotor-stator configuration for such an engine.

Turbo engines are characterized by a sequential arrangement of rotating and stationary blade cascades, also referred to as the rotor and stator. FIG. 1, for example, shows the arrangement of the rotor and stator in an aircraft engine. The working medium (typically air) passes in the direction of the arrow, through the combination of rotors and stators in the different modules a, b, c of the turbo engine. In FIG. 1 reference letter a designates the fan section, which includes, in the direction of flow, the combination of the fan R1 and the guide vane S1 in the primary circuit 1, and/or the outlet guide vane S2 in the secondary circuit 2. The compressor stage b includes, in the direction of flow, the combination of the impeller R3 and the guide vane S3; and the turbine stage c includes, in the direction of flow, the combination of the guide vane S4 and the impeller R4.

Other turbo engines are known, for example, as compressors, fans, or power plant turbines.

One of the primary noise sources of this arrangement is the so-called rotor-stator interaction or stator-rotor interaction. Such rotor-stator interaction noise is the product of the following mechanism: Due to the periodic peripheral wake of a rotating blade cascade (rotor), a downstream stationary blade cascade (stator) is exposed to period transient flow, causing periodic hydrodynamic pressure fluctuations to be applied to these stator blades, which are emitted to the surrounding area as tonal noise. Also, when a rotating blade cascade (rotor) penetrates the stationary wake of an upstream stationary blade cascade (stator), the rotor blades are subjected to periodic transient flow, causing periodic pressure fluctuations on these rotor blades, which are emitted to the surrounding area as tonal noise.

During take-off and landing, the afore-mentioned mechanisms contribute considerably to the noise emission of commercial airplanes and therefore represent a restrictive variable with respect to the ever more stringent noise protection regulations of airports and their surrounding areas.

Both active and passive noise attenuation systems are known. For example, acoustic liners are installed in the delimiting areas of the flow ducts of the engine, or the rotor-stator spacing is increased. U.S. Pat. No. 4,313,387, on the other hand, discloses a passive system, where reduced noise is achieved by curving the stator blades. One disadvantage of these measures is that the size and the weight of the engine increase.

Another passive measure, where the rotor comprises a serrated shape at the rear edge, is disclosed in European patent document EP 1 277 966.

U.S. Pat. No. 5,335,417 and U.S. Pat. No. 5,420,383 disclose active measures for noise reduction, in which acoustic sources are disposed in the inlet of the engine and/or secondary duct of a turbo engine and/or in the stator blade. These measures are based on the anti-noise principle. To this end, by means of a complex distribution of acoustic sources, the attempt is made to imitate the modular characteristic nature of the sound field. A disadvantage is that these methods and systems are very complex.

Additionally, U.S. Pat. No. 6,004,095 discloses a method for achieving noise reduction by continuously blowing the rotor trailing edge.

One object of the invention, therefore, is to provide a method, which improves the reduction of noise emission in turbo engines by means of active measures.

Another object of the invention is to provide a rotor-stator arrangement, which allows reduces noise generation in turbo engines.

These and other objects and advantages achieved by the method and apparatus according to the invention, in which the hydrodynamic pressure fluctuations occurring on the blade cascades are lowered by varying the surface circulation of at least one section of at least one stator. Unlike the known methods, this technique directly addresses the source where the noise is produced.

In an advantageous embodiment of the invention, the surface circulation of one or more blades of the stator is varied. To this end, it is particularly advantageous that the aerodynamic characteristics of the stator are influenced by the deflection of one or more blades of the stator or sections of the blades. Of course it is possible to influence the aerodynamics of any arbitrary number of stators present in a turbo engine, with the method according to the invention.

In particular it is advantageous to vary the surface circulation of the stator periodically. Furthermore, according to another advantageous embodiment of the invention, the control of the individual stator blades of a blade cascade can be performed either individually or corresponding to the separation and the rotational speed of the rotor, with a delay. The control frequency of periodic processes advantageously corresponds to the base frequency of the tonal noise and is obtained from the product of the number of rotor blade and the rotational speed. The phase position and/or the amplitude of the control are advantageously controlled corresponding to suitable error signals, which are supplied in particular from microphones or pressure sensors. The method according to the invention therefore makes it possible to adjust the surface circulation of the stator blades, such that the pressure fluctuations produced by the peripheral wake of an upstream rotating blade cascade on these stator blades are reduced, or that the pressure fluctuations produced by the wake these stator blades on a downstream rotating blade cascade are reduced.

Of course it is possible in the case of a multi-stage configuration of a turbo engine to employ a combination of the effects described above.

The rotor-stator arrangement according to the invention comprises one or more stator means for influencing the aerodynamics of the stator. The means advantageously are:
- one or more stator blades which are movable about a predefined axis;
- one or more movable leading edge flaps, which are disposed on one or more blades of the stator;
- one or more movable trailing edge flaps, which are disposed on one or more blades of the stator; and
- one or more movable surface elements, which are disposed on one or more blades of the stator.

Additionally, one or more openings for the suction and/or blowing of air are provided on the surface of one or more blades of the stator. In this manner, it is also possible to influence the pressure fluctuations. Particularly when performing period blowing and/or suction steps on the surface of the stator blades, it is possible to reduce the pressure fluctuations produced by the peripheral wake of an upstream rotating cascade.

In another advantageous embodiment of the inventive rotor-stator arrangement, one or more openings for blowing air are provided on the trailing edge of one or more blades of a stator. In a suitable configuration, continuous blowing of air on the trailing edge of the stator blades harmonizes the circulation of a downstream rotating cascade, thus lowering resultant pressure fluctuations.

Advantageously, the means for influencing the aerodynamics of a stator are mechanically, electrically, piezo-electrically or pneumatically operated actuators. Of course it is possible, depending on the application and position of an actuator in the rotor-stator arrangement, to use different actuators. Contrary to the actuators used in known methods or devices for attenuating noise in turbo engines, the actuators used in the method according to the invention, and the rotor-stator arrangement according to the invention, do not serve to generate of an anti-noise field, which compensates the sound field produced by the turbo engine. According to the invention, the actuators serve to deflect the stator or sections of the stator, particularly the blades or sections of the blades.

An active system corresponding to the present invention can be suitably combined with passive systems, so that it is possible, for example, to activate the system in addition to any passive systems that are present in airplane engines, during the noise-relevant flight phases (take-off and landing).

The system according to the invention can of course also be used in turbo engines which are not used in the aeronautics industry, for example in power plant turbines.

One advantage of the invention is that the system is maintenance-and assembly-friendly since the actuators are provided in the stationary system of the stators.

Other objects, advantages and novel features of the present invention will become apparent from the following detailed description of the invention when considered in conjunction with the accompanying drawings.

DETAILED DESCRIPTION OF THE DRAWINGS

Figure 1:
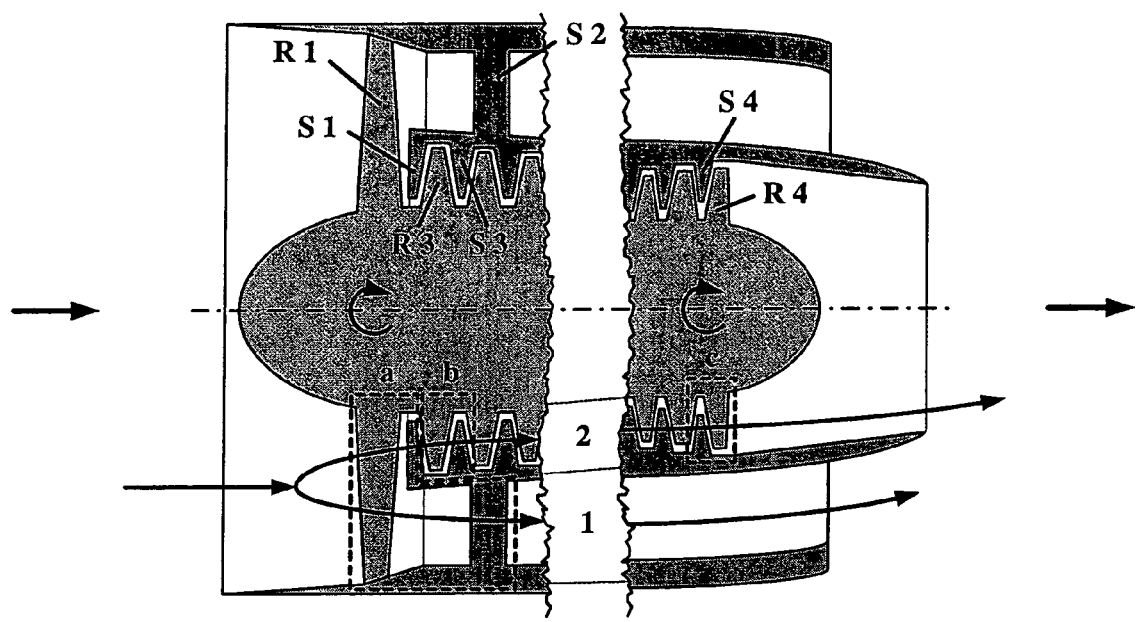
FIG. 1 is an example of an engine in a sectional view.
Figure 2:
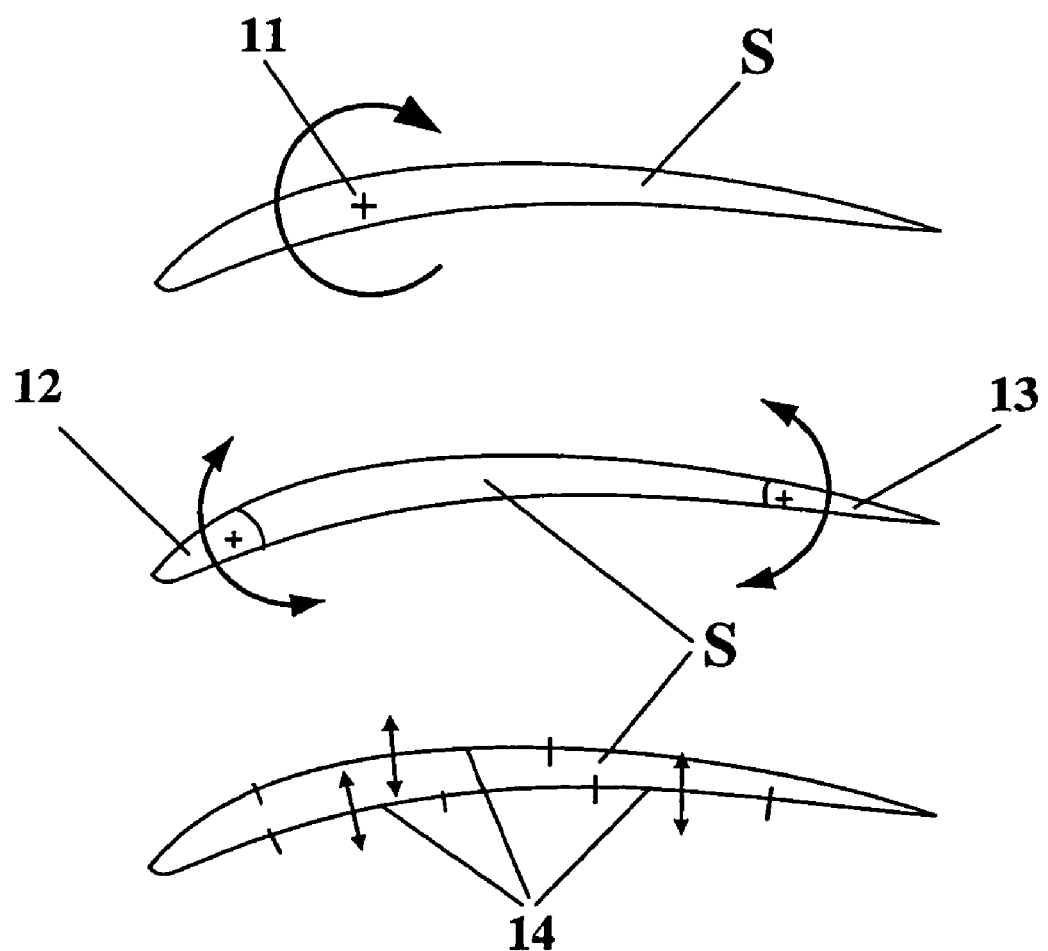
FIG. 2 is an example of the blades of a stator with the means according to the invention for varying the aerodynamics of the stator.

FIG. 2 shows, by way of example, the blades of a stator with the means according to the invention for varying the aerodynamics of the stator. Reference numeral 11 here designates any arbitrary axis, about which the blade S is movably disposed. A blade S can be provided with leading edge flaps 12 and/or trailing edge flaps 13. Beyond that, a blade S may comprise one or more means 14 (actuators, for example), which are disposed on the surface of the blade S.

Figure 3:
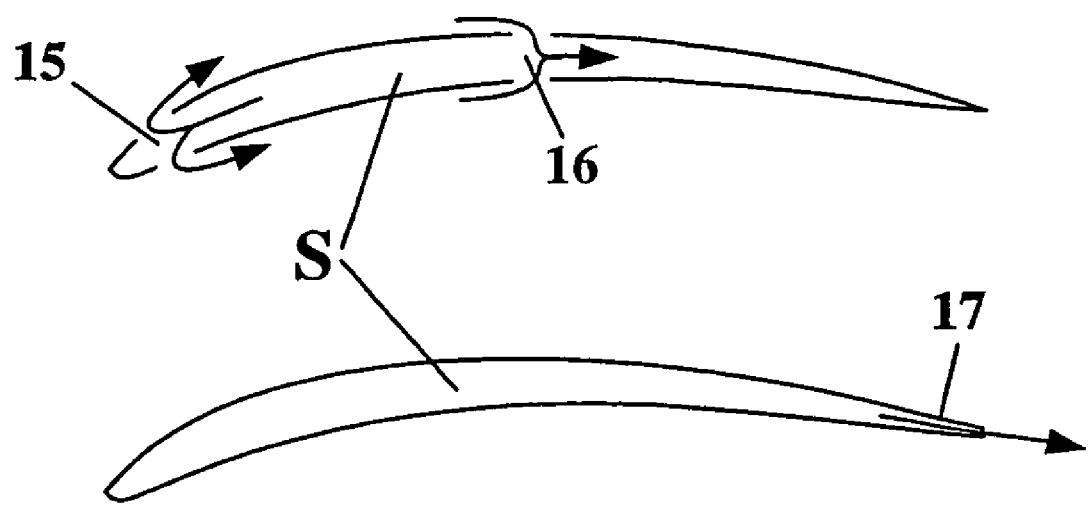
FIG. 3 shows examples of the blades of a stator with openings for the suction and blowing of air.

FIG. 3 shows the upper part of an example of a blade S, which comprises openings 15 and 16 in the area of the leading edge and in the center area. These openings 15 and 16 can serve either to suck an air or to blow air. The lower part of FIG. 3 shows an example of a blade S, which comprises an opening 17 in the area of the trailing edge, which allows air to be blown out continuously. Of course the means 15, 16, 17 for the suction and blowing of air can be mutually combined arbitrarily. It can be provided, for example, also that adjoining blades of a stator comprise openings for the suction or blowing of air, which openings are disposed in different configurations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for reducing noise generation in a turbo engine with rotating blade cascades and stationary blade cascades, said method comprising:
    reducing hydrodynamic pressure fluctuations that impinge on said cascades by periodically varying an aerodynamic characteristic of at least a section of at least one stationary blade cascade, at a frequency that corresponds to a product of a number of rotor blades of one of said rotating blade cascades and a rotational speed thereof, whereby surface circulation on said at least one section varies in a manner that corresponds to said periodic variation.

2. The method according to claim 1, wherein the surface circulation of at least one blade of the stationary blade cascades is varied.

3. The method according to claim 2, wherein the aerodynamic characteristics of the stator are varied through the deflection of at least one blade or sections thereof.

4. The method according to claim 2, wherein the aerodynamic characteristics of the stator are varied by air flowing into or out of at least one blade.

5. The method according to claim 4, wherein air is blown out continuously on a trailing edge of at least one blade of the stator in a manner which harmonizes circulation of downstream cascades.

6. The method according to claim 2, wherein several blades of a stator are controlled, corresponding, with a delay, to separation and rotational speed of the stator.

7. The method according to claim 1, wherein surface circulation of the stator is varied periodically.

8. A method for reducing noise generation in a turbo engine with rotating blade cascades, said method comprising:
    reducing hydrodynamic pressure fluctuations occurring on the cascades by varying a surface circulation of at least a section of at least one stationary blade cascade; wherein,
    the surface circulation of one or more blads of the stator is varied;
    several blades of a stator are controlled corresponding, with a delay, to separation and rotational speed of the stator; and
    at least one of phase position and amplitude of control is regulated in response to error signals.

9. A method for reducing noise generation in a turbo engine with rotating blade cascades, said method comprising:
    reducing hydrodynamic pressure fluctuations occurring on the cascades by varying a surface circulation of at least a section of at least one stationary blade cascade; wherein,
    surface circulation of the stator is varied periodically; and
    a control frequency of periodic variation corresponds to a base frequency of tonal noise resulting from the product of the rotor blade number and the rotational speed.

10. A rotor-stator arrangement, comprising:
    a rotor;
    a stator; and
    means provided on at least one stator, for influencing surface circulation of at least one section of the stator;
    wherein said means for influencing said surface circulation reduces hydrodynamic pressure fluctuations that impinge on said cascades by periodically varying an aerodynamic characteristic of at least a section of at least one stationary blade cascade, at a frequency that corresponds to a product of a number of rotor blades of one of said rotating blade cascades and a rotational speed thereof, whereby surface circulation on said at least one section varies in a manner that corresponds to said periodic variation.

11. The rotor-stator arrangement according to claim 10, wherein said means provided on said at least one stator comprises at least one leading edge flap disposed on at least one blade of the stator.

12. The rotor-stator arrangement according to claim 10, wherein said means provided on said at least one stator comprises at least one trailing edge flap disposed on at least one blade of the stator.

13. The rotor-stator arrangement according to claim 10, wherein at least one blade of the stator is movable about a predefined axis.

14. The rotor-stator arrangement according to claim 10, wherein at least one blade of the stator has at least one movable surface element.

15. The rotor-stator arrangement according to claim 10, wherein at least one opening is provided on a surface of at least one blade of the stator, for taking in or blowing out air.

16. The A rotor-stator arrangement according to any claim 10, wherein at least one opening is provided on a trailing edge of at least one blade of the stator, for continuously blowing out air.

17. The rotor-stator arrangement according to claim 10, wherein:
   actuators are provided for influencing movement of said means; and
   said actuators are operated by a technique which is one of mechanical, electrical, piezo-electrical, hydraulic and pneumatic.

18. The rotor-stator arrangement according to claim 10, wherein hydrodynamic pressure fluctuations occurring on the cascades are reduced by varying the surface circulation of at least a section of at least one stator.

19. An engine comprising a rotor-stator arrangement according to claim 18.

20. An airplane comprising an engine according to claim 19.

* * * * *